(12) United States Patent
Chae

(10) Patent No.: US 9,069,138 B2
(45) Date of Patent: Jun. 30, 2015

(54) IMAGING LENS

(71) Applicant: LG INNOTEK CO., LTD., Seoul (KR)

(72) Inventor: Kyung Pil Chae, Seoul (KR)

(73) Assignee: LG INNOTEK CO., LTD., Seoul (KR)

(*) Notice: Subject to any disclaimer, the term of this patent is extended or adjusted under 35 U.S.C. 154(b) by 0 days.

(21) Appl. No.: 14/029,441

(22) Filed: Sep. 17, 2013

(65) Prior Publication Data

US 2014/0078602 A1    Mar. 20, 2014

(30) Foreign Application Priority Data

Sep. 18, 2012  (KR) .................. 10-2012-0103387

(51) Int. Cl.
  *G02B 9/34*   (2006.01)
  *G02B 13/18*  (2006.01)
  *G02B 13/00*  (2006.01)

(52) U.S. Cl.
  CPC *G02B 9/34* (2013.01); *G02B 13/18* (2013.01); *G02B 13/004* (2013.01)

(58) Field of Classification Search
  CPC ......... G02B 13/004; G02B 13/18; G02B 9/34
  USPC .................................. 359/715, 773
  See application file for complete search history.

(56) References Cited

U.S. PATENT DOCUMENTS

2011/0075272 A1*  3/2011  Yuan et al. ............... 359/715

* cited by examiner

*Primary Examiner* — David N Spector
(74) *Attorney, Agent, or Firm* — Saliwanchik, Lloyd & Eisenschenk

(57) ABSTRACT

An exemplary embodiment of the present invention relates to an imaging lens, the imaging lens including, in an ordered way from an object side, a first lens having positive (+) refractive power, a second lens having negative (−) refractive power, a third lens having positive (+) refractive power, a fourth lens having negative (−) refractive power, wherein the imaging lens meets a conditional expression of D4−D3≤0, where D3 is a distance from an apex of an object side surface of the third lens to an apex of an image side surface of the third lens, and D4 is an axial distance from the apex of an object side surface of the third lens to an effective diameter of an object side surface of the fourth lens.

13 Claims, 3 Drawing Sheets

IMAGING LENS

CROSS-REFERENCE TO RELATED APPLICATION

This application claims the benefit under 35 U.S.C. §119 of Korean Patent Application No. 10-2012-0103387, filed Sep. 18, 2012, which is hereby incorporated by reference in its entirety.

BACKGROUND

1. Field of the Disclosure

The teachings in accordance with exemplary embodiments of this disclosure relate generally to an imaging lens.

2. Description of Related Art

This section provides background information related to the present disclosure which is not necessarily prior art.

Recently, vigorous research efforts are being made in the fields of a mobile phone-purpose camera module, a digital still camera (DSC), a camcorder, and a PC camera (an imaging device attached to a person computer), all connected with an image pick-up system. One of the most important components in order that a camera module related to such image pickup system obtains an image is a lens producing an image.

The mobile phones are being recently miniaturized and thinned in thickness thereof, and mounted with components for performing various functions. As a result, the reality is that various researches and development are being waged to pursue miniaturization of an imaging lens of a camera module for mobile phones.

BRIEF SUMMARY

Accordingly, exemplary embodiments of the present disclosure may relate to an imaging lens that substantially obviates one or more of the above disadvantages/problems due to limitations and disadvantages of related art, and it is an object of the present disclosure to provide a miniaturized compact imaging lens configured to have a high resolution.

Technical problems to be solved by the present disclosure are not restricted to the above-mentioned, and any other technical problems not mentioned so far will be clearly appreciated from the following description by skilled in the art.

In one general aspect of the present disclosure, there is provided an imaging lens, the imaging lens comprising: in an ordered way from an object side, a first lens having positive (+) refractive power;

a second lens having negative (−) refractive power;

a third lens having positive (+) refractive power;

a fourth lens having negative (−) refractive power, wherein the imaging lens meets a conditional expression of D4-D3≤0, where D3 is a distance from an apex of an object side surface of the third lens to an apex of an image side surface of the third lens, and D4 is an axial distance from the apex of the object side surface of the third lens to an effective diameter of an object side surface of the fourth lens.

Preferably, but not necessarily, the first lens may take a meniscus shape convexly formed at both surfaces to an object side.

Preferably, but not necessarily, the second lens may take a concave shape at both surfaces.

Preferably, but not necessarily, the third lens may take a meniscus shape convexly formed at both surfaces to an image side.

Preferably, but not necessarily, the first, second, third and fourth lenses may be aspherical at both surfaces.

Preferably, but not necessarily, the imaging lens may meet a conditional expression of f1/f≥0.8, where an entire focal length of an optical system is f, and a focal length of the first lens is f1.

Preferably, but not necessarily, the imaging lens may meet a conditional expression of $1.0 < |f2/f1| < 2.0$, where focal lengths of the first and second lenses are f1 and f2.

Preferably, but not necessarily, the imaging lens may meet a conditional expression of R2>R1, where R1 is a radius of curvature for the first lens to an object side surface, and R2 is a radius of curvature for the second lens to an object side surface.

Preferably, but not necessarily, the imaging lens may meet a conditional expression of $0.1 < R1/R2 < 0.14$, where R1 is a radius of curvature for the first lens to an object side surface, and R2 is a radius of curvature for the second lens to an object side surface.

Preferably, but not necessarily, the imaging lens may meet a conditional expression of $-127 < R3/R4 < -66.0$, where R3 is a radius of curvature for the third lens to an object side surface, and R4 is a radius of curvature for the fourth lens to an object side surface.

Preferably, but not necessarily, the imaging lens may meet a conditional expression of $1.5 < ND < 1.6$, where ND is a refractive index of the first, third and fourth lenses, respectively.

Preferably, but not necessarily, the imaging lens may meet a conditional expression of $1.6 < ND2 < 1.7$, where ND2 is a refractive index of the second lens.

Preferably, but not necessarily, the imaging lens may meet a conditional expression of $50 < Vd < 60$, where Vd is an Abbe's number of the first, third and fourth lenses, respectively.

Preferably, but not necessarily, the imaging lens may meet a conditional expression of $20 < Vd2 < 30$, where Vds is an Abbe's number of the second lens.

The exemplary embodiments of the present disclosure can realize a miniaturized compact construction of an imaging lens configured with 4 (four) pieces of lenses.

DETAILED DESCRIPTION

Exemplary embodiments of the present disclosure will be described in detail with reference to the accompanying drawings.

Figure 1:
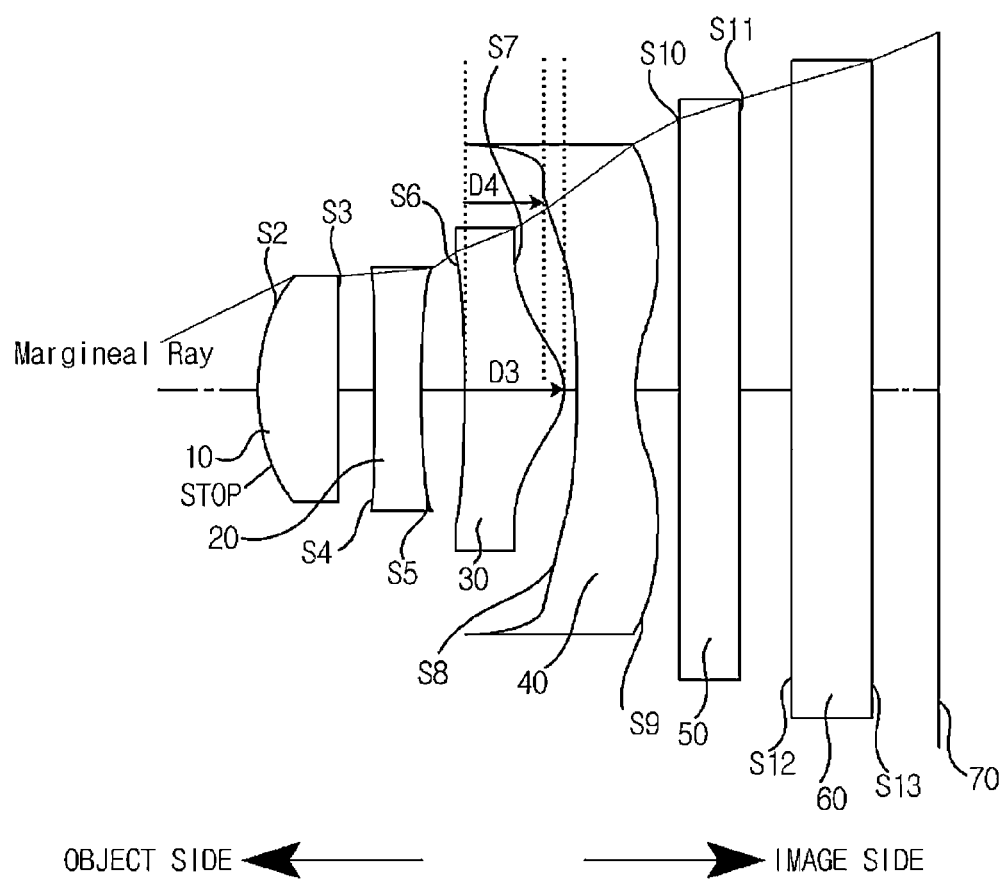
FIG. 1 is a constructional view illustrating a camera module lens according to an exemplary embodiment of the present disclosure.

FIG. 1 is a constructional view illustrating a camera module lens according to an exemplary embodiment of the present invention.

The camera module lens according to an exemplary embodiment of the present invention is arranged with an imaging lens comprised of a plurality of lenses about an optical axis. In the constructional view of FIG. 1, relative thickness, size and shape of a lens may be exaggerated or reduced for clarity and explanations throughout, and spherical or aspherical shape may be proposed as an example, and therefore the shape is not limited thereto.

Referring to FIG. 1, the camera lens module may be arranged with, in an ordered way from an object side, an aperture, a first lens (10), a second lens (20), a third lens (30), a fourth lens (40), a filter (50), a cover glass (60) and a photo-detector (70).

Light corresponding to image information of a subject is incident on the photo-detector (70) by passing the first lens (10), the second lens (20), the third lens (30), the fourth lens (40), the filter (50) and the cover glass (60).

Hereinafter, in the description of the construction of each lens, an "object side surface" means a surface of a lens facing an object side with respect to an optical axis, and an "image side surface" means a surface of the lens facing a capturing surface with respect to the optical axis.

The first lens (10) may have a positive (+) refractive power, the second lens (20) has a negative (−) refractive power, the third lens (30) has a positive (+) refractive power and the fourth lens (40) has a negative (−) refractive power. At this time, the first lens (10) may take a meniscus shape convexly formed at both surfaces to an object side. Furthermore, the second lens (20) may take a bi-concave shape at both surfaces and the third lens (30) may take a meniscus shape convexly formed at both surfaces to an image side.

In addition, the fourth lens (40) may take a meniscus shape concavely formed at both surfaces to an image side, and the first, second, third and fourth lenses (10, 20, 30, 40) may be aspherical at both surfaces.

Hence, the exemplary embodiment of the present invention can realize a super small-sized camera module including the 4 (four) pieces of lenses thus explained.

For information, 'S2 and 'S3' of FIG. 1 are respectively an object side surface and an image side surface of the first lens (10), 'S4' and 'S5' are respectively an object side surface and an image side surface of the second lens (20), 'S6' and 'S7' are respectively an object side surface and an image side surface of the third lens (30), 'S8' and 'S9' are respectively an object side surface and an image side surface of the fourth lens (40), 'S10' and 'S11' are respectively an object side surface and an image side surface of the filter (50), and 'S12' and 'S13' are respectively an object side surface and an image side surface of the cover glass (60).

The filter (50) may be any one optical filter selected from an infrared filter and a cover glass. If the infrared filter is applied for the camera module, the infrared filter blocks infrared ray emitted from external light from being transferred to the photo-detector (70). Furthermore, the infrared filter transmits visible light, reflects infrared ray and outputs the reflected infrared ray to the outside.

The photo-detector (70) may be an image sensor including CCD (Charge Coupled Device) or CMOS (Complementary Metal Oxide Semiconductor), for example.

Because the later-described conditional expressions and exemplary embodiments are preferred embodiments enhancing an effect of interaction, it would be obvious to those skilled in the art that the present disclosure is not necessarily comprised of the following conditions. For example, only by satisfying some conditions of later-described conditional expressions, the lens construction (framework) of the present disclosure may have an enhanced effect of interaction.

| | |
|---|---|
| $D4-D3 \leq 0$ | [Conditional expression 1] |
| $f1/f \geq 0.8$ | [Conditional expression 2] |
| $11.0 < |f2/f1| < 2.0$ | [Conditional expression 3] |
| $R2 > R1$ | [Conditional expression 4] |
| $0.1 < R1/R2 < 0.14, -127 < R3/R4 < -66.0$ | [Conditional expression 5] |
| $1.5 < ND < 1.6$ | [Conditional expression 6] |
| $1.6 < ND2 < 1.7$ | [Conditional expression 7] |
| $50 < Vd < 60$ | [Conditional expression 8] |
| $20 < Vd2 < 30$, | [Conditional expression 9] | where,

D3: a distance from an apex of an object side surface of the third lens to an apex of an image side surface of the third lens.

D4: an axial distance from the apex of the object side surface of the third lens to an effective diameter of an object side surface of the fourth lens, f: an entire focal length of an optical system, f1, f2: focal lengths of the first and second lenses, R1: a radius of curvature for the first lens to an object side surface, R2: a radius of curvature for the second lens to an object side surface, R3: a radius of curvature for the third lens to an object side surface, R4: a radius of curvature for the fourth lens to an object side surface, ND: a refractive index of the first, third and fourth lenses, ND2: a refractive index of the second lens, Vd: an Abbe's number of the first, third and fourth lenses, and Vds: an Abbe's number of the second lens.

The conditional expression 1 can realize a super small-sized camera module, because a difference between D4 (an axial distance from the apex of the object side surface of the third lens to an effective diameter of an object side surface of the fourth lens) and D3 (a distance from an apex of an object side surface of the third lens to an apex of an image side surface of the third lens is smaller than or equal to zero (0) by very closely positioning an air clearance of the third lens and an air clearance of the fourth lens.

Hereinafter, the action and effect of the present disclosure will be described with reference to a specific exemplary embodiment. Aspheric mentioned in a later-exemplary embodiment is obtained from a known Equation 1, and 'E and its succeeding number' used in Conic constant k and aspheric coefficient A, B, C, D, E, F indicates 10's power. For example, E+01 denotes $10^1$, and E-02 denotes $10^{-2}$.

$$z = \frac{cY^2}{1 + \sqrt{1-(1+K)c^2Y^2}} + AY^4 + BY^4 + CY^4 + DY^4 + EY^4 + FY^4 + \ldots \quad \text{[Equation 1]}$$

where, z: a distance from the lens's top-point to an optical axis direction, c: basic curvature of a lens, Y: a distance towards a direction perpendicular to an optical axis, K: Conic constant, and A, B, C, D, E, F: aspheric coefficients

EXEMPLARY EMBODIMENTS

The following Table 1 shows an exemplary embodiment matching the aforementioned conditional expressions.

TABLE 1

| Exemplary embodiments | |
|---|---|
| f | 1.3419 |
| f1 | 1.066842 |
| f2 | −1.976662 |
| Nd | 1.531158 |
| Nd2 | 1.632 |
| Vd | 56.5 |
| Vd2 | 23 |
| R1 | 0.50257 |
| R2 | 3.75035 |
| R3 | −85.15076 |
| R4 | 1.27668 |

Referring to Table 1, it can be noted that f1/f is 1.25 that matches the conditional expression 2, and R2>R1 by 3.24778 that matches the conditional expression 4, and ND is 1.531158 that matches the conditional expression 8.

The following Table 2 shows an exemplary embodiment which is a more detailed exemplary embodiment over that of Table 1.

TABLE 2

| Surface number | Radius of curvature (R) | Thickness or distance (d) | Refractive index (N) |
|---|---|---|---|
| OBJ. | INFINITY | INFINITY | |
| STOP | INFINITY | 0 | |
| 2* | 0.50257 | 0.226008 | 1.531158 |
| 3* | 3.75035 | 0.077727 | |
| 4* | −85.15076 | 0.125000 | 1.632780 |
| 5* | 1.27668 | 0.155788 | |
| 6* | −1.19320 | 0.221927 | 1.531158 |
| 7* | −0.30408 | 0.029789 | |
| 8* | 18.78723 | 0.150000 | 1.531158 |
| 9* | 0.37080 | 0.070000 | |
| 10 | INFINITY | 0.150000 | 1.522998 |
| 11 | INFINITY | 0.070129 | |
| 12 | INFINITY | 0.200000 | 1.525498 |
| 13 | INFINITY | 0.161699 | |
| image | INFINITY | −0.001376 | |

The notation * in the above Table 2 and following Table 3, which is further written near the surface number indicates aspheric. The following Tables 3 and 4 show a value of aspheric coefficient of each lens in the exemplary embodiment of Table 2.

TABLE 3

| Surface number | k | A | B | C | D | E | F |
|---|---|---|---|---|---|---|---|
| 2* | −4.753684 | 0.485283E+01 | −0.187680E+02 | 0.100736E+03 | −0.74472E+02 | | |
| 3* | −11.783915 | −0.860706E−01 | −0.379051E+01 | | | | |
| 4* | 0 | −0.232804E+01 | 0.216877E+02 | −0.832629E+03 | 0.107059E+05 | −0.467593E+05 | |
| 5* | 0 | −0.254195E+00 | 0.551610E+01 | −0.145886E+03 | 0.159596E+04 | | |
| 6* | 0.558208 | 0.887390E+00 | 0 | | | | |
| 7* | −5.101146 | −0.523317E+01 | 0.759283E+02 | −0.626714E+03 | 0.344088E+04 | −0.723627E+04 | |
| 8* | 410.531529 | E+01 | 0.201333E+02 | −0.715343E+02 | 0.144198E+02 | 0.927383E+03 | −0.195923E+04 |
| 9* | −8.865011 | E+01 | 0.148148E+02 | −0.593046E+02 | 0.137019E+03 | −0.179168E+03 | 0.983066E+02 |

Figure 2:
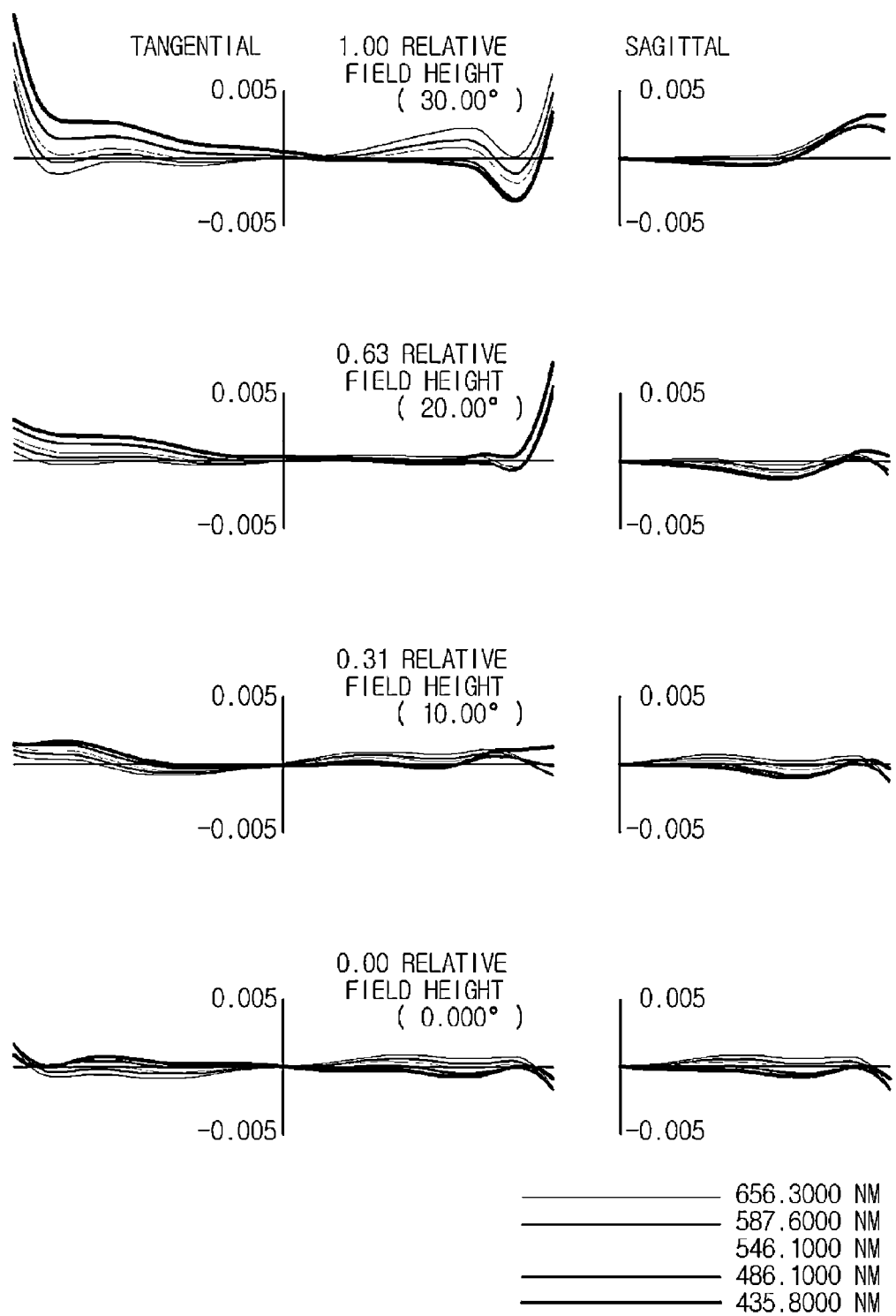
FIG. 2 is a graph measuring coma aberration according to an exemplary embodiment of the present disclosure.

FIG. 2 is a graph each measuring coma aberration according to an exemplary embodiment of the present disclosure, where tangential aberration and sagittal aberration of each wavelength based on a field height are measured. In FIG. 2, it is interpreted that a coma aberration correcting function is good as curves approach the X axis from a positive axis and a negative axis. In the measurement exemplary embodiment of FIG. 2, because values of images in nearly all fields proximate to the X axis, coma aberration correction function demonstrates a superior figure.

Figure 3:
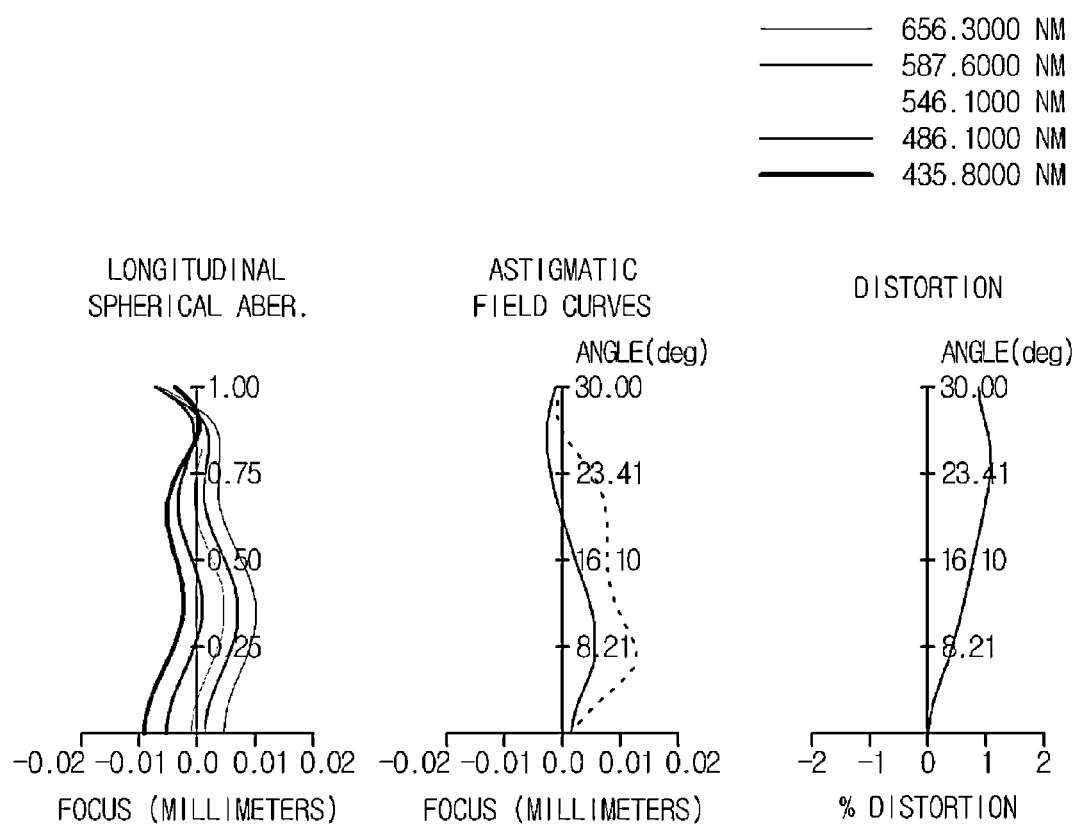
FIG. 3 is a graph illustrating an aberration according to an exemplary embodiment of the present disclosure.

Furthermore, FIG. 3 is a graph illustrating an aberration according to an exemplary embodiment of the present disclosure.

That is, FIG. 3 is a graph measuring longitudinal spherical aberration, astigmatic field curves and distortion in order from left side. In FIG. 3, a Y axis means size of an image, and an X axis means focal length (unit: mm) and distortion degree (unit: %). In FIG. 3, it is interpreted that an aberration correcting function is good as curves approach the Y axis. In the shown aberration diagram, because values of images in nearly all fields appear proximate to the Y axis, spherical aberration, astigmatic aberration and distortion aberration all demonstrate a superior figure.

That is, a range of the longitudinal spherical aberration is −0.009 mm∼+0.009 mm, a range of astigmatic aberration is −0.004 mm∼+0.013 mm, and a range of distortion aberration is 0 mm∼+1.1 mm, such that the imaging lens according to the exemplary embodiments of the present disclosure can correct the characteristics of spherical aberration, astigmatic aberration and distortion aberration, whereby the imaging lens according to the exemplary embodiment of the present invention has an excellent lens characteristics.

The previous description of the present disclosure is provided to enable any person skilled in the art to make or use the invention. Various modifications to the invention will be readily apparent to those skilled in the art, and the generic principles defined herein may be applied to other variations without departing from the spirit or scope of the invention. Thus, the invention is not intended to limit the examples described herein, but is to be accorded the widest scope consistent with the principles and novel features disclosed herein.

What is claimed is:

1. An imaging lens comprising, in an ordered way from an object side to an image side:
    a first lens having positive (+) refractive power, wherein the first lens takes a meniscus shape such that an object side surface and an image side surface of the first lens are convexly formed to the object side;
    a second lens having negative (−) refractive power;
    a third lens having positive (+) refractive power;
    a fourth lens having negative (−) refractive power,
    wherein the imaging lens meets a conditional expression of D4-D3≤0, where D3 is a distance from an apex of an object side surface of the third lens to an apex of an image side surface of the third lens, and D4 is an axial distance from the apex of the object side surface of the third lens to an effective diameter of an object side surface of the fourth lens.

2. The imaging lens of claim 1, wherein the second lens takes a concave shape at both surfaces.

3. The imaging lens of claim 1, wherein the third lens takes a meniscus shape such that the object side surface and the image side surface of the third lens are convexly formed to the image side.

4. The imaging lens of claim 1, wherein the first, second, third and fourth lenses are aspherical at both surfaces.

5. The imaging lens of claim 1, meeting a conditional expression of f1/f≥0.8, where an entire focal length of an optical system is f, and a focal length of the first lens is f1.

6. The imaging lens of claim 1, meeting a conditional expression of 1.0<|f2/f1|<2.0, where focal lengths of the first and second lenses are f1 and f2.

7. The imaging lens of claim 1, meeting a conditional expression of R2>R1, where R1 is a radius of curvature for the first lens to an object side surface, and R2 is a radius of curvature for the second lens to an object side surface.

8. The imaging lens of claim 1, meeting a conditional expression of 0.1<R1/R2<0.14, where R1 is a radius of curvature for the first lens to an object side surface, and R2 is a radius of curvature for the second lens to an object side surface.

9. The imaging lens of claim 1, meeting a conditional expression of −127<R3/R4<−66.0, where R3 is a radius of curvature for the third lens to the object side surface, and R4 is a radius of curvature for the fourth lens to the object side surface.

10. The imaging lens of claim 1, meeting a conditional expression of 1.5<ND<1.6, where ND is a refractive index of the first, third and fourth lenses, respectively.

11. The imaging lens of claim 1, meeting a conditional expression of 1.6<ND2<1.7, where ND2 is a refractive index of the second lens.

12. The imaging lens of claim 1, meeting a conditional expression of 50<Vd<60, where Vd is an Abbe's number of the first, third and fourth lenses, respectively.

13. The imaging lens of claim 1, meeting a conditional expression of 20<Vd2<30, where Vd2 is an Abbe's number of the second lens.

* * * * *